(12) United States Patent
Cho et al.

(10) Patent No.: US 7,903,771 B2
(45) Date of Patent: Mar. 8, 2011

(54) TIME-DOMAIN IQ MISMATCH DETECTION APPARATUS OF OFDM RECEIVER

(75) Inventors: Young Ha Cho, Gyunggi-do (KR); Kyung Uk Kim, Seoul (KR); Bon Young Koo, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 597 days.

(21) Appl. No.: 11/947,508

(22) Filed: Nov. 29, 2007

(65) Prior Publication Data

US 2008/0130780 A1    Jun. 5, 2008

(30) Foreign Application Priority Data

Nov. 30, 2006   (KR) .......................... 10-2006-119886

(51) Int. Cl.
*H03D 1/04* (2006.01)
(52) U.S. Cl. ....................................................... 375/346
(58) Field of Classification Search .......... 375/260–261, 375/267–269, 271, 273, 279, 295, 298, 302, 375/308, 319, 322, 324, 329, 340, 371, 285, 375/296, 346; 370/206, 208, 277, 280–281, 370/295, 343, 436, 478, 480, 481; 455/130, 455/313, 323–324, 334, 500–501; 329/304, 329/307, 318, 346

See application file for complete search history.

(56) References Cited

U.S. PATENT DOCUMENTS

| 7,366,255 | B1* | 4/2008 | Hwang et al. ................. 375/324 |
| 7,388,926 | B2* | 6/2008 | Ishikawa et al. ............... 375/285 |
| 7,620,124 | B2* | 11/2009 | Coersmeier .................... 375/322 |
| 7,627,055 | B2* | 12/2009 | Coersmeier .................... 375/296 |
| 7,738,572 | B2* | 6/2010 | Lin ................................ 375/260 |
| 2003/0112898 | A1* | 6/2003 | Song et al. ..................... 375/324 |
| 2004/0066861 | A1* | 4/2004 | Song et al. ..................... 375/316 |
| 2006/0057996 | A1* | 3/2006 | Petrovic et al. ................ 455/260 |
| 2007/0104291 | A1* | 5/2007 | Yoon .............................. 375/324 |

\* cited by examiner

*Primary Examiner* — Tesfaldet Bocure
*Assistant Examiner* — Lawrence Williams
(74) *Attorney, Agent, or Firm* — Lowe, Hauptman, Ham & Berner, LLP

(57) ABSTRACT

A time-domain IQ mismatch detection apparatus for detecting mismatch between an I-channel signal and a Q-channel signal in unit of a sample included in a symbol of an OFDM signal comprises: a first delayer which delays an input I-channel signal by one sample interval; a second delayer which delays an input Q-channel signal by one sample interval; a first phase mismatch detector which multiplies a currently-input I-channel signal with a currently-input Q-channel signal and output a result thereof; a second phase mismatch detector which multiplies the currently-input I-channel signal and the delayed Q-channel signal and output a result thereof; a third phase mismatch detector which multiplies the delayed I-channel signal with the currently-input Q-channel signal and output a result thereof; and a phase error arithmetic unit which outputs a phase error value calculated using the outputs of the first, second and third phase mismatch detectors.

8 Claims, 6 Drawing Sheets

TIME-DOMAIN IQ MISMATCH DETECTION APPARATUS OF OFDM RECEIVER

CROSS-REFERENCE TO RELATED APPLICATIONS

This application claims the priority of Korean Patent Application No. 2006-119886 filed on Nov. 30, 2006, in the Korean Intellectual Property Office, the disclosure of which is incorporated herein by reference.

BACKGROUND OF THE INVENTION

1. Field of the Invention

The present invention relates to an apparatus of detecting mismatch between an in-phase-channel (I-channel) signal and a quadrature-channel (Q-channel) signal in an orthogonal frequency division multiplexing (OFDM) receiver, and more particularly, to a time-domain IQ mismatch detection apparatus in an OFDM receiver capable of minimizing an influence of fading caused from a channel.

2. Description of the Related Art

An orthogonal frequency division multiplexing (OFDM) scheme is a well-known high-speed data transmission scheme for the next-generation communication technology. In the OFDM transmission scheme, a sequence of symbols which are serially input is converted into parallel data (parallel symbols) in units of a predetermined block, and a plurality of the parallel symbols are multiplexed with different subcarrier frequencies. The OFDM scheme is implemented by fast Fourier transform (FFT) and inverse fast Fourier transform (IFFT). The OFDM scheme can be simply performed by using the orthogonality between the carriers and the definition of the FFT.

In a radio frequency (RF) stage which converts a RF signal into a baseband signal, cost of an RF processing structure and system complexity are increased. In order to solve the problems, a zero-IF scheme for directing converting the RF signal into the baseband signal without use of an intermediate frequency (IF). In addition, the zero-IF reception structure can be implemented as the RF stage into a system-on-chip (SoC) structure which is not complicated.

However, an actual zero-IF receiver has shortcomings in that it is impossible to completely perform image rejection in the down-converting process using orthogonal demodulation.

The shortcomings are caused from incompleteness of analog circuits such as incompleteness of 90°-shifting of a local oscillating signal generated by a local oscillator and mismatching of a mixer and a filter. The impossibility of image rejection results in IQ mismatch between an I-channel signal and a Q-channel signal of a baseband receiver.

As an approach for solving the IQ mismatch, high-performance analog parts having less than 2° of phase mismatch and less than 2% of amplitude mismatch can be used to reject the image. However, since these analog parts are very expensive, product cost is highly increased. Therefore, there have been proposed approaches for compensating for the IQ mismatch of signals received at a baseband by using inexpensive analog parts.

Conventional IQ mismatch compensating schemes are mainly classified into a frequency-domain IQ mismatch compensating scheme and a time-domain IQ mismatch compensating scheme.

As a reprehensive scheme of the frequency-domain IQ mismatch compensating scheme, there is a scheme in where a transmitter transmits a specific pilot signal, and a receiver receives the pilot signal to estimate IQ mismatch. In the frequency-domain IQ mismatch compensating scheme, signal deformation caused from a channel and signal deformation caused from IQ mismatch can be compensated simultaneously, so that an effective IQ mismatch compensation performance can be obtained. However, the frequency—domain IQ mismatch compensating scheme can be applied to only the signal having the pilot signals in a predetermined time interval. In a system such as a terrestrial digital multimedia broadcasting (T-DMB) system with a signal structure having a small number of the pilot signals (for example, a signal structure having 76 symbols in one frame wherein the first symbol of one frame being the pilot signal), the IQ mismatch compensation performance is deteriorated. Therefore, the frequency-domain IQ mismatch compensating scheme is not suitable for a receiver of the T-DMB system.

On the other hand, in a conventional time-domain IQ mismatch compensating scheme, the pilot signal is not required. FIG. 1 is a block diagram illustrating a construction of an apparatus for implementing the conventional time-domain IQ mismatch compensating scheme (hereinafter, simply referred to as a time-domain IQ mismatch compensating apparatus).

Referring to FIG. 1, the conventional time-domain IQ mismatch compensating apparatus includes: a correlation compensator 11 which compensates for amplitude and phase of an I-channel signal $s_I^{adc}(n)$ and a Q-channel signal $s_Q^{adc}(n)$ input according to output signals $u_a(n)$ and $u_p(n)$ of a first loop filter 121 and a second loop filter 131; a amplitude mismatch detection unit 12 including an amplitude mismatch detector 121 which detects an amplitude difference between IQ-mismatch-compensated I-channel signal $s_I(n)$ and Q-channel signal $s_Q(n)$ output from the correlation compensator 11 and a first loop filter 122 which filters an amplitude difference signal $e_a(n)$ detected by the amplitude mismatch detector 121 so as not to be diverged; and phase mismatch detection unit 13 including a phase mismatch detector 131 which detects a phase difference between the IQ-mismatch-compensated I-channel signal $s_I(n)$ and Q-channel signal $s_Q(n)$ output from the correlation compensator 11 and a second loop filter 132 which filters an phase difference signal $e_p(n)$ detected by the phase mismatch detector 131 so as not to be diverged. The amplitude mismatch detector 121 subtracts an absolute value of the Q-channel signal from an absolute value of the I-channel signal to obtain the amplitude difference, and the phase difference mismatch detector 131 multiplies the I-channel signal with the Q-channel signal to obtain the phase difference.

According to the time-domain IQ mismatch compensating scheme implemented by the time-domain IQ mismatch compensating apparatus as shown in FIG. 1, the amplitude mismatch and the phase mismatch are detected in units of a sample included in a symbol of the OFDM signal.

As described above, the time-domain IQ mismatch compensating scheme can be applied to compensate for the IQ mismatch in a case where there is no pilot signal. However, in a case where the received OFDM signal is influenced by fading caused from a communication channel, reliabilities of the amplitude difference detection and the phase difference detection of the amplitude mismatch detector 121 and the phase mismatch detector 131 may be deteriorated.

Therefore, in a system such as a T-DMB system having a zero-IF type RF processing structure, an apparatus for detecting the amplitude mismatch and the phase mismatch of IQ signals capable of minimizing an influence of fading by using a time-domain IQ mismatch compensating scheme without use of a pilot signal is required.

SUMMARY OF THE INVENTION

An aspect of the present invention provides a time-domain IQ mismatch detection apparatus of an orthogonal frequency division multiplexing (OFDM) receiver capable of detecting amplitude mismatch and phase mismatch between an I-channel signal and a Q-channel signal by minimizing an influence of fading caused from a communication channel.

According to an aspect of the present invention, there is provided a time-domain IQ mismatch detection apparatus for detecting mismatch between an I-channel signal and a Q-channel signal in unit of a sample included in a symbol of an OFDM signal received by an OFDM receiver, the time-domain IQ mismatch detection apparatus comprising a phase IQ mismatch detection unit, wherein the phase IQ mismatch detection unit comprises: a first delayer which delays an input I-channel signal by one sample interval; a second delayer which delays an input Q-channel signal by one sample interval; a first phase mismatch detector which multiplies a currently-input I-channel signal with a currently-input Q-channel signal and output a result thereof; a second phase mismatch detector which multiplies the currently-input I-channel signal and the delayed Q-channel signal and output a result thereof; a third phase mismatch detector which multiplies the delayed I-channel signal with the currently-input Q-channel signal and output a result thereof; and a phase error arithmetic unit which multiplies the outputs of the second and third phase mismatch detectors with an attenuation coefficient, adds results thereof, and subtracts the addition result from the output of the first phase mismatch detector to output a phase error value.

In the above aspect, the phase error arithmetic unit may comprise: a first multiplier which multiplies the output of the second phase mismatch detector with the attenuation coefficient; a second multiplier which multiplies the output of the third phase mismatch detector with the attenuation coefficient; an adder which adds the outputs of the first multiplier and the second multiplier; and a subtractor which subtracts the output of the adder from the output of the first phase mismatch detector.

According to another aspect of the present invention, there is provided a time-domain IQ mismatch detection apparatus for detecting mismatch between an I-channel signal and a Q-channel signal in unit of a sample included in a symbol of an OFDM signal received by an OFDM receiver, the time-domain IQ mismatch detection apparatus comprising an amplitude IQ mismatch detection unit, wherein the amplitude IQ mismatch detection unit comprises: a first delayer which delays an input I-channel signal by one sample interval; a first multiplier which multiplies the delayed I-channel signal with an attenuation coefficient; a first phase difference detector which obtains a phase difference between a currently-input I-channel signal and the delayed I-channel signal multiplied with an attenuation coefficient; a modified I-channel amplitude arithmetic unit which adds an absolute value of the currently-input I-channel signal and an absolute value of the delayed I-channel signal multiplied with the attenuation coefficient and subtracts a multiplication value of the phase difference obtained by the first phase difference detector with a conversion coefficient from the addition result and outputs a result thereof; a second delayer which delays an input Q-channel signal by one sample interval; a second multiplier which multiplies the delayed Q-channel signal with the attenuation coefficient; a second phase difference detector which obtains a phase difference between a currently-input Q-channel signal and the delayed Q-channel signal multiplied with the attenuation coefficient; a modified Q-channel amplitude arithmetic unit which adds an absolute value of the currently-input Q-channel signal and an absolute value of the delayed Q-channel signal multiplied with the attenuation coefficient and subtracts a multiplication value of the phase difference obtained by the second phase difference detector with the conversion coefficient from the addition result and outputs a result thereof; and an amplitude error arithmetic unit which subtracts the output of the modified Q-channel amplitude arithmetic unit from the output of the modified I-channel amplitude arithmetic unit.

The modified I-channel amplitude arithmetic unit may comprise: a first absolute value arithmetic unit which calculates an absolute value of the currently-input I-channel signal and outputs the absolute value; a second absolute value arithmetic unit which calculates an absolute value of the delayed I-channel signal multiplied with the attenuation coefficient and outputs the absolute value; a third multiplier which multiplies the conversion coefficient with the output of the first phase difference detector and output a result thereof; a first adder which adds the output of the second absolute value arithmetic unit and the output of the third multiplier and output a result thereof; and a second adder which adds the outputs of the first absolute value arithmetic unit and the output of the first adder and output a result thereof.

The modified Q-channel amplitude arithmetic unit may comprise: a third absolute value arithmetic unit which calculates an absolute value of the currently-input Q-channel signal and outputs the absolute value; a fourth absolute value arithmetic unit which calculates an absolute value of the delayed Q-channel signal multiplied with the attenuation coefficient and outputs the absolute value; a fourth multiplier which multiplies the conversion coefficient with the output of the second phase difference detector and output a result thereof; a third adder which adds the output of the fourth absolute value arithmetic unit and the output of the fourth multiplier and output a result thereof; and a fourth adder which adds the outputs of the third absolute value arithmetic unit and the output of the third adder and output a result thereof.

The amplitude error arithmetic unit may be a subtractor which subtracts the output of the second adder from the output of the second adder.

The first phase difference detector may comprise: a third delayer which delays the currently-input I-channel signal by one sample interval and output a result thereof; a fourth delayer which delays the delayed I-channel signal multiplied with the attenuation coefficient by one sample interval and output a result thereof; a first sub phase difference detector which multiplies the currently-input I-channel signal with the delayed I-channel signal multiplied with the attenuation coefficient and output a result thereof; a second sub phase difference detector which multiplies the currently-input I-channel signal with the output of the fourth delayer and output a result thereof; a third sub phase difference detector which multiplies the delayed I-channel signal multiplied with the attenuation coefficient with the output of the third delayer; and an I-channel phase difference arithmetic unit which multiplies the outputs of the second and third sub phase difference detectors with the attenuation coefficient, adds results thereof, subtract the addition result from the output of the first sub phase difference detector, and output a result thereof.

The second phase difference detector may comprise: a fifth delayer which delays the currently-input Q-channel signal by one sample interval and output a result thereof; a sixth delayer which delays the delayed Q-channel signal multiplied with the attenuation coefficient by one sample interval and output a result thereof; a fourth sub phase difference detector which multiplies the currently-input Q-channel signal with the delayed Q-channel signal multiplied with the attenuation coefficient and output a result thereof; a fifth sub phase difference detector which multiplies the currently-input Q-channel signal with the output of the sixth delayer and output a result thereof; a sixth sub phase difference detector which multiplies the delayed Q-channel signal multiplied with the attenuation coefficient with the output of the fifth delayer; and a Q-channel phase difference arithmetic unit which multiplies the outputs of the fifth and sixth sub phase difference detectors with the attenuation coefficient, adds results thereof, subtract the addition result from the output of the third sub phase difference detector, and output a result thereof.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will now be described in detail with reference to the accompanying drawings. The embodiments of the present invention can be modified in various aspects, and the scope of the invention is not limited to the embodiments. It should be noted that the embodiments of the present invention is provided for the better understanding of the ordinarily skilled in the art. In the specification, terms of components are defined in consideration of functions of the components. Therefore, the terms may be changed according to an intention the ordinarily skilled in the art or a usage in the art, but not limited to technical components having restrictive meanings.

Figure 1:
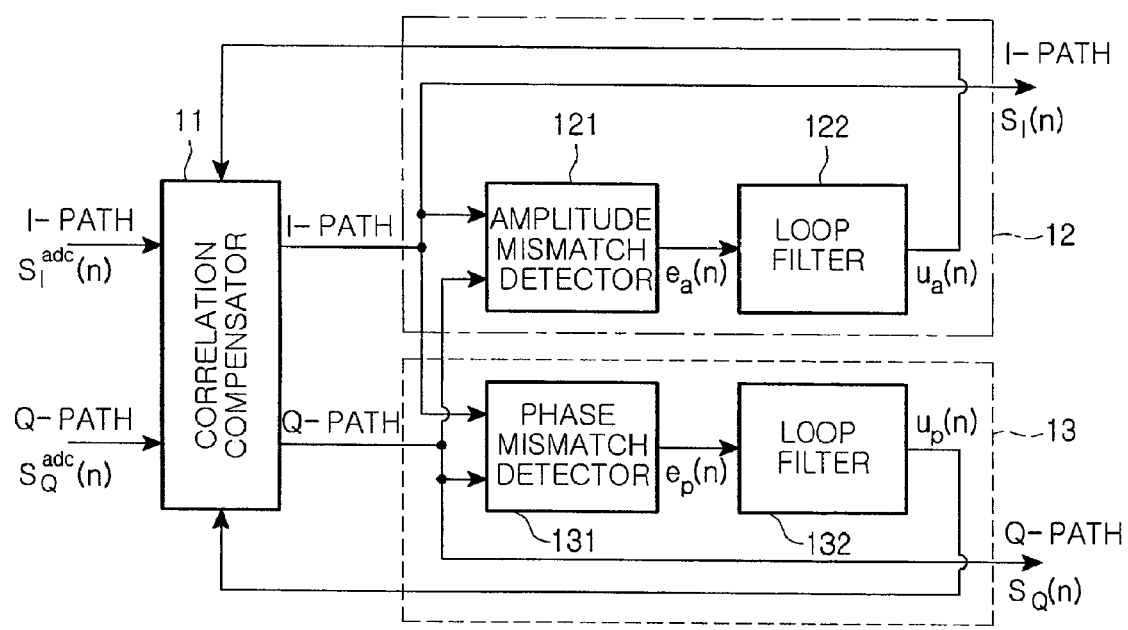
FIG. 1 is a block diagram illustrating a construction of a conventional time-domain IQ mismatch compensating apparatus.
Figure 2:
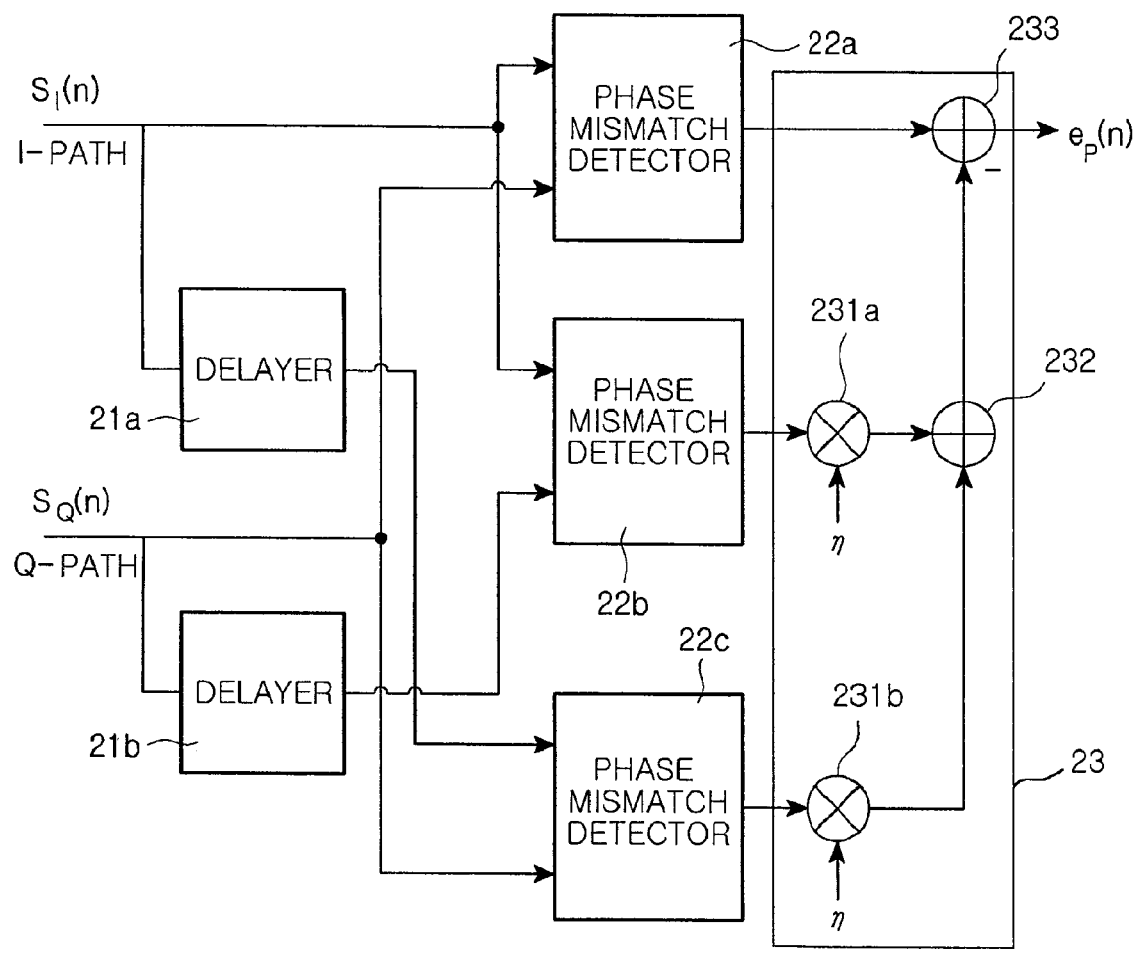
FIG. 2 is a block diagram illustrating a construction of a time domain phase IQ mismatch detection unit according to the present invention.

FIG. 2 is a block diagram illustrating a construction of a time domain phase IQ mismatch detection unit according to the present invention. The time domain phase IQ mismatch detection unit shown in FIG. 2 can be used as a substitute for the phase mismatch detector 131 shown in FIG. 1. The time domain phase IQ mismatch detection unit can reduce an influence of fading to an orthogonal frequency division multiplexing (OFDM) signal, so that an accuracy of phase mismatch detection can be improved.

Referring to FIG. 2, the time domain phase IQ mismatch detection unit according to the present invention includes: a first delayer 21a which delays an input I-channel signal by one sample interval; a second delayer 21b which delays an input Q-channel signal by one sample interval; a first phase mismatch detector 22a which multiplies a currently-input I-channel signal with a currently-input Q-channel signal and outputs a result thereof; a second phase mismatch detector 22b which multiplies the currently-input I-channel signal with the delayed Q-channel signal and outputs a result thereof; a third phase mismatch detector 22c which multiplies the delayed I-channel signal with the currently-input Q-channel signal and outputs a result thereof; and a phase error arithmetic unit 23 which multiplies the outputs of the second and third phase mismatch detectors with an attenuation coefficient η, adds results thereof, and subtracts the addition result from the output of the first phase mismatch detector to output a phase error value.

The phase error arithmetic unit 23 may include: a first multiplier 231a which multiplies the output of the second phase mismatch detector 22b with the attenuation coefficient η; a second multiplier 231b which multiplies the output of the third phase mismatch detector 22c with the attenuation coefficient η; an adder 232 which adds the output of the first multiplier 231a and the output of the second multiplier 231b; and a subtractor 233 which subtracts the output of the adder 232 from the output of the first phase mismatch detector 22a.

Figure 3:
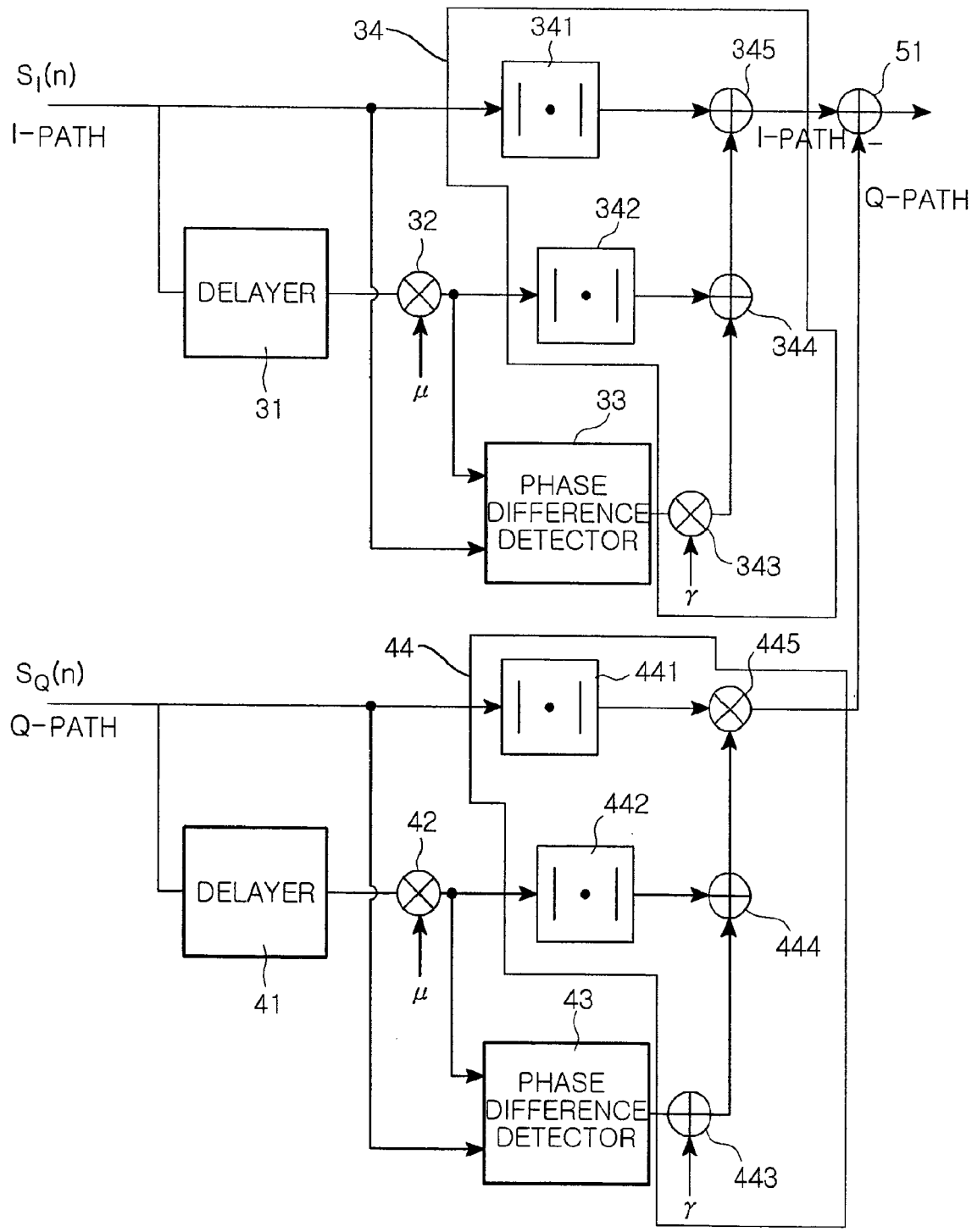
FIG. 3 is a block diagram illustrating a construction of a time domain amplitude IQ mismatch detection unit according to the present invention.

FIG. 3 is a block diagram illustrating a construction of a time domain amplitude IQ mismatch detection unit according to the present invention. The time domain amplitude IQ mismatch detection unit shown in FIG. 2 can be used as a substitute for the phase mismatch detector 121 shown in FIG. 1. The time domain amplitude IQ mismatch detection unit can reduce an influence of fading to an OFDM signal, so that an accuracy of amplitude mismatch detection can be improved.

Referring to FIG. 3, the time domain amplitude IQ mismatch detection unit according to the present invention includes: a first delayer 31 which delays an input I-channel signal by one sample interval; a first multiplier 32 which multiplies the delayed I-channel signal with an attenuation coefficient η; a first phase difference detector 33 which obtains a phase difference between the currently-input I-channel signal and the delayed I-channel signal multiplied with the attenuation coefficient η; a modified I-channel amplitude arithmetic unit 34 which adds an absolute value of the currently-input I-channel signal and an absolute value of the delayed I-channel signal multiplied with the attenuation coefficient η, subtracts a multiplication value of the phase difference obtained by the first phase difference detector 33 with a conversion coefficient γ from the addition result to output a result thereof; a second delayer 41 which delays an input Q-channel signal by one sample interval; a second multiplier 42 which multiplies the delayed Q-channel signal with the attenuation coefficient η; a second phase difference detector 43 which obtains a phase difference between the currently-input Q-channel signal and the delayed Q-channel signal multiplied with the attenuation coefficient η; a modified Q-channel amplitude arithmetic unit 44 which adds an absolute value of the currently-input Q-channel signal and an absolute value of the delayed Q-channel signal multiplied with the attenuation coefficient η, subtracts a multiplication value of the phase difference obtained by the second phase difference detector 43 with the conversion coefficient γ from the addition result to output a result thereof; and an amplitude error arithmetic unit 51 which subtracts the output of the modified Q-channel amplitude arithmetic unit 44 from the output of the modified I-channel amplitude arithmetic unit 34.

The modified I-channel amplitude arithmetic unit 34 may include: a first absolute value arithmetic unit 341 which calculates the absolute value of the currently-input I-channel signal and outputs a result thereof; a second absolute value arithmetic unit 342 which calculates the absolute value of the delayed I-channel signal multiplied with the attenuation coefficient η and outputs a result thereof; a third multiplier 343 which multiplies the output of the first phase difference detector 33 with the conversion coefficient γ and outputs a result thereof; a first adder 344 which adds the output of the second absolute value arithmetic unit 342 and the output of the third multiplier 343 and outputs a result thereof; and a second adder 345 which adds the output of the first absolute value arithmetic unit 341 and the outputs of the first adder 344 and outputs a result thereof.

The modified Q-channel amplitude arithmetic unit 44 may include: a third absolute value arithmetic unit 441 which calculates the absolute value of the currently-input Q-channel signal and outputs a result thereof; a fourth absolute value arithmetic unit 442 which calculates the absolute value of the delayed Q-channel signal multiplied with the attenuation coefficient η and outputs a result thereof; a fourth multiplier 443 which multiplies the output of the second phase difference detector 43 with the conversion coefficient γ and outputs a result thereof; a third adder 444 which adds the output of the fourth absolute value arithmetic unit 442 and the output of the fourth multiplier 443 and outputs a result thereof; and a fourth adder 445 which adds the output of the third absolute value arithmetic unit 441 and the output of the third adder 444.

In addition, the amplitude error arithmetic unit 51 may be a subtractor 51 which subtracts the output of the fourth adder 445 from the output of the second adder 345.

Hereinafter, operations and effects of the present invention will be described in detail.

Figure 4:
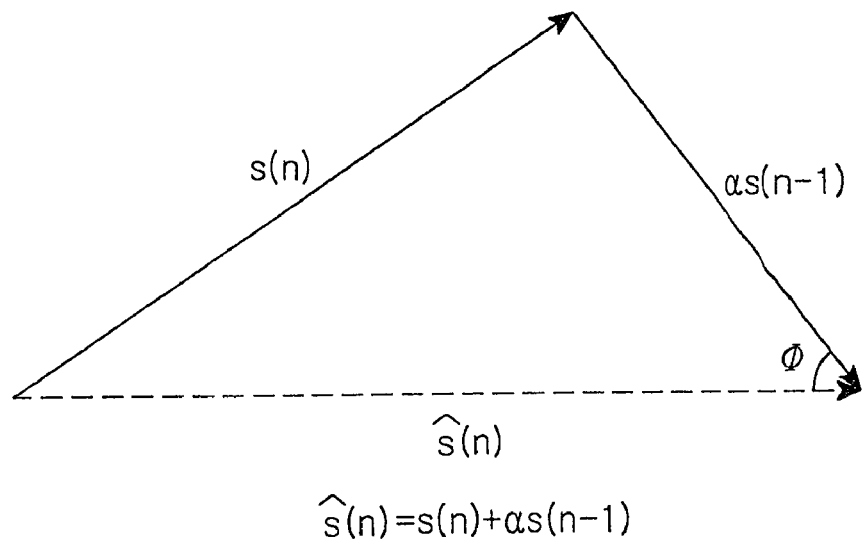
FIG. 4 is a view illustrating a signal vector presentation of an OFDM signal in occurrence of fading.

Firstly, a concept of an OFDM signal in occurrence of fading is described with reference to FIG. 4. FIG. 4 is a view illustrating a signal vector presentation of an OFDM signal in occurrence of the fading.

Referring to FIG. 4, when an OFDM transmitter transmits a signal s(n), an OFDM receiver ideally receives only the transmitted signal s(n). However, in an actual environment, the currently-received signal of the OFDM receiver includes a previous sample component s(n−1) as well as the signal s(n) transmitted by the OFDM transmitter. The currently-received signal ŝ(n) can be expressed as a vector addition shown in FIG. 4. The vector addition can be expressed by the following Equations 1 and 2.

$$\hat{s}_I(n) = s_I(n) + \alpha s_I(n-1)$$ [Equation 1]

$$\hat{s}_Q(n) = s_Q(n) + \alpha s_Q(n-1)$$ [Equation 2]

Equation 1 expresses a received I-channel signal coupled with a fading component, and Equation 2 expresses a received Q-channel signal coupled with the fading component. Since the present invention relates to a time-domain IQ mismatch detection apparatus, it can be understood that the received signals in Equations 1 and 2 are analog-to-digital (AD) converted signals on which the OFDM receiver performs time-domain IQ mismatch detection, and the received signals are samples in a symbol that is an unit of the IQ mismatch detection. In Equations 1 and 2, the coefficient α denotes an attenuation value of a previous sample, and the coefficient α is assumed to have a value of about 0.1 to 0.3. Namely, it can be understood that the signal that the OFDM receiver receives under the influence of fading includes the previous sample component by about 10 to 30% of the currently-transmitted signal of the OFDM transmitter.

The IQ mismatch detection can be performed by using the following Equations 3 and 4. Equation 3 expresses the amplitude IQ mismatch, and Equation 4 expresses the phase IQ mismatch.

$$e_a(n) = |\hat{s}_I(n)| - |\hat{s}_Q(n)|$$ [Equation 3]

$$e_p(n) = \hat{s}_I(n) \cdot \hat{s}_Q(n)$$ [Equation 4]

As shown in Equation 3, for detection of the amplitude IQ mismatch, a difference between the absolute values of the I-channel signal and the Q-channel signal is calculated, and for detection of the phase IQ mismatch, a multiplication value of the I-channel signal with the Q-channel signal is calculated.

By using Equations 1 and 4, the amplitude IQ mismatch and the phase IQ mismatch of the signal in occurrence of the fading can be expressed by the following Equations 5 and 6.

$$e_a(n) = |s_I(n) + \alpha \cdot s_I(n-1)| - |s_Q(n) + \alpha \cdot s_Q(n-1)|$$ [Equation 5]

$$e_p(n) = s_I(n) \cdot s_Q(n) + \alpha \cdot s_I(n-1) \cdot s_Q(n) + \alpha \cdot s_I(n) \cdot s_Q(n-1) + \alpha^2 \cdot s_I(n-1) \cdot s_Q(n-1)$$ [Equation 6]

As shown in Equations 5 and 6, when the fading occurs in a communication channel, the mismatch between the I-channel signal and the Q-channel signal cannot be accurately detected due to the components associated with the fading. As a result, performance of an IQ mismatch compensating apparatus is greatly deteriorated. The present invention provides an amplitude IQ mismatch detection unit and a phase IQ mismatch detection unit capable of minimizing an influence of the fading components occurring in the amplitude IQ mismatch and the phase IQ mismatch expressed by Equations 5 and 6.

Firstly, operations of the phase IQ mismatch detection unit are described with reference to FIG. 2.

As shown in FIG. 2, the I-channel signal having the fading components and the Q-channel signal having the fading components are input to the phase IQ mismatch detection unit. The I-channel signal having the fading components and the Q channel signal having the fading components are delayed by one sample interval in the first delayer 21a and the second delayer 21b, respectively.

The first phase mismatch detector 22a multiplies the currently-input I-channel signal having the fading components with the currently-input Q-channel signal having the fading components.

The second phase mismatch detector 22b multiplies the currently-input I-channel signal having the fading components with the delayed Q-channel signal (delayed by the second delayer 21b) having the fading components and output a result thereof. Since the output signal of the second phase mismatch detector 22b is a multiplication of the signal obtained by delaying the Q-channel signal by one sample interval with the currently-input I-channel signal, the output of the second phase mismatch detector 22b includes the term $s_I(n)s_Q(n-1)$ of Equation 6, and all the other terms include an attenuation coefficient α or α². Since the output of the second phase mismatch detector 22b is subsequently multiplied with an additional attenuation coefficient η in the phase error arithmetic unit 23, the coefficients of the other terms excluding the term $s_I(n) \cdot s_Q(n-1)$ have very small values, so that the terms can be negligible.

Similarly, the third phase mismatch detector 22c multiplies the currently-input Q-channel signal having the fading components with the delayed I-channel signal (delayed by the first delayer 21a) having the fading components and outputs a result thereof. Since the output signal of the third phase mismatch detector 22c is a multiplication of the signal obtained by delaying the I-channel signal by one sample interval with the currently-input Q-channel signal, the output of the third phase mismatch detector 22c includes the term $s_I(n-1)s_Q(n)$ of Equation 6, and all the other terms include an attenuation coefficient α or α². Since the output of the third phase mismatch detector 22c is subsequently multiplied with an additional attenuation coefficient η in the phase error arithmetic unit 23, the coefficients of the other terms excluding the term $s_I(n-1)s_Q(n)$ have very small values, so that the terms can be negligible.

As described above, the signals output from the second and third phase mismatch detectors 22b and 22c are multiplied with the attenuation coefficient η by the first and second multipliers 231a and 231b in the phase error arithmetic unit 23, respectively. The attenuation coefficient η is preferably equal to the attenuation coefficient α corresponding to the case where a previous sample signal is added in occurrence of the fading. However, in a system where a pilot signal is not used, it is difficult to accurately calculate the attenuation coefficient α. Therefore, the attenuation coefficient η may be stably obtained by using an iterative simulation or an empirical method. The first and second multipliers 231a and 231b multiply the outputs of the second phase mismatch detector 22b and the third phase mismatch detector 22c with the attenuation coefficient η, respectively, so that the signals obtained by actually multiplying the term $s_I(n)s_Q(n-1)$ and the term $s_I(n-1)s_Q(n)$ with the η can be output. The outputs of the first and second multipliers 231a and 231b are added to each other by the adder 232.

On the other hand, since the first phase mismatch detector 22a multiplies the current I-channel signal having the fading components with the current Q-channel signal having the fading components, the 1 phase mismatch detector 22a outputs the signal expressed by Equation 6. As described above, since the terms having the coefficient α² in Equation 6 is very small, the terms can be negligible.

The subtractor 233 of the phase error arithmetic unit 23 subtracts the signal output from the adder 232 from the signal output from the first phase mismatch detector 22a. Since the signal output from the adder 232 is signal obtained by adding the terms $s_I(n)s_Q(n-1)$ multiplied with the attenuation coefficient η and the term $s_I(n-1)s_Q(n)$ multiplied with the attenuation coefficient η, the terms $s_I(n)s_Q(n-1)$ and $s_I(n-1)s_Q(n)$ expressed in FIG. 6 can be removed by the subtractor 233. Therefore, the signals output from the subtractor 233 become signals of which I-channel and Q-channel phase mismatch with the influence of the fading components removed are detected.

Subsequently, operations of the amplitude IQ mismatch detection unit are described with reference to FIG. 3.

As shown in FIG. 4, the amplitude IQ mismatch detection unit according to the present invention obtains a phase difference φ between the received signal and the previous sample signal, that is, the fading component by applying a trigonometric method to a triangle constituted by the associated signals and estimates a size of the signal s(n) transmitted from the OFDM transmitter.

As shown in FIG. 3, the I-channel signal having the fading components and the Q-channel signal having the fading components are input to the amplitude IQ mismatch detection unit. The I-channel signal having the fading components and the Q channel signal having the fading components are delayed by one sample interval in the first delayer 31 and the second delayer 41, respectively.

The first multiplier 32 and the second multiplier 42 multiply the delayed signals (delayed by one sample interval by the first delayer 31 and the second delayer 41) with the attenuation coefficient μ. The attenuation coefficient μ is calculated by the same principle as that used for calculating the attenuation coefficient η described with respect to the aforementioned phase IQ mismatch detection unit.

The first phase difference detector 33 detects the phase difference φ between the currently-received I-channel signal having the fading components and the delayed I-channel signal multiplied with the attenuation coefficient η output from the first multiplier 32 and outputs the phase difference φ. The output of the first phase difference detector 33 is multiplied with the conversion coefficient γ by the third multiplier 343 of the modified I-channel amplitude arithmetic unit 34. The conversion coefficient γ can be determined by using the cosine law. The first absolute value arithmetic unit 341 of the modified I-channel amplitude arithmetic unit 34 outputs the absolute value of the currently-input I-channel signal having the fading components, and the second absolute value arithmetic unit 341 of the modified I-channel amplitude arithmetic unit 34 outputs the absolute value of the delayed I-channel signal multiplied with the attenuation coefficient μ. The outputs of the first absolute value arithmetic unit 341, the second absolute value arithmetic unit 342, and the third multiplier 343 are added to each other by the first adder 344 and the second adder 345 of the modified I-channel amplitude arithmetic unit 34 so as to generate the modified I-channel signal that is the output of the modified I-channel amplitude arithmetic unit 34. Namely, the modified I-channel amplitude arithmetic unit 34 can calculate the I-channel signal with the fading components removed by applying the cosine law to the triangle constituted by the associated signals shown in FIG. 4.

Similarly, the second phase difference detector 43 detects the phase difference φ between the currently-received Q-channel signal having the fading components and the delayed Q-channel signal multiplied with the attenuation coefficient η output from the second multiplier 42 and output the phase difference φ.

The output of the second phase difference detector 43 is multiplied with the conversion coefficient γ by the fourth multiplier 443 of the modified Q-channel amplitude arithmetic unit 44. The third absolute value arithmetic unit 441 of the modified Q-channel amplitude arithmetic unit 44 outputs the absolute value of the currently-input Q-channel signal having the fading components, and the fourth absolute value arithmetic unit 441 of the modified Q-channel amplitude arithmetic unit 44 outputs the absolute value of the delayed Q-channel signal multiplied with the attenuation coefficient μ. The outputs of the third absolute value arithmetic unit 441, the fourth absolute value arithmetic unit 442, and the fourth multiplier 443 are added to each other by the third adder 444 and the fourth adder 445 of the modified Q-channel amplitude arithmetic unit 44 so as to generate the modified Q-channel signal that is the output of the modified Q-channel amplitude arithmetic unit 44. Namely, the modified Q-channel amplitude arithmetic unit 44 can calculate the Q-channel signal with the fading components removed by applying the cosine law to the triangle constituted by the associated signals shown in FIG. 4.

The amplitude IQ mismatch detection unit 51 subtracts the output of the modified Q-channel amplitude arithmetic unit 44 from the output of the modified I-channel amplitude arithmetic unit 34, so that the amplitude IQ mismatch detection unit 51 can detect the amplitude IQ mismatch with the fading component removed.

Since all the signals input to the first phase difference detector 33 and the second phase difference detector 43 include the fading components, the aforementioned structure of the phase IQ mismatch detector shown in FIG. 2 may be employed to the first phase difference detector 33 and the second phase difference detector 43 to remove the influence of the fading component so as to more accurately detect the phase difference.

Figure 5:
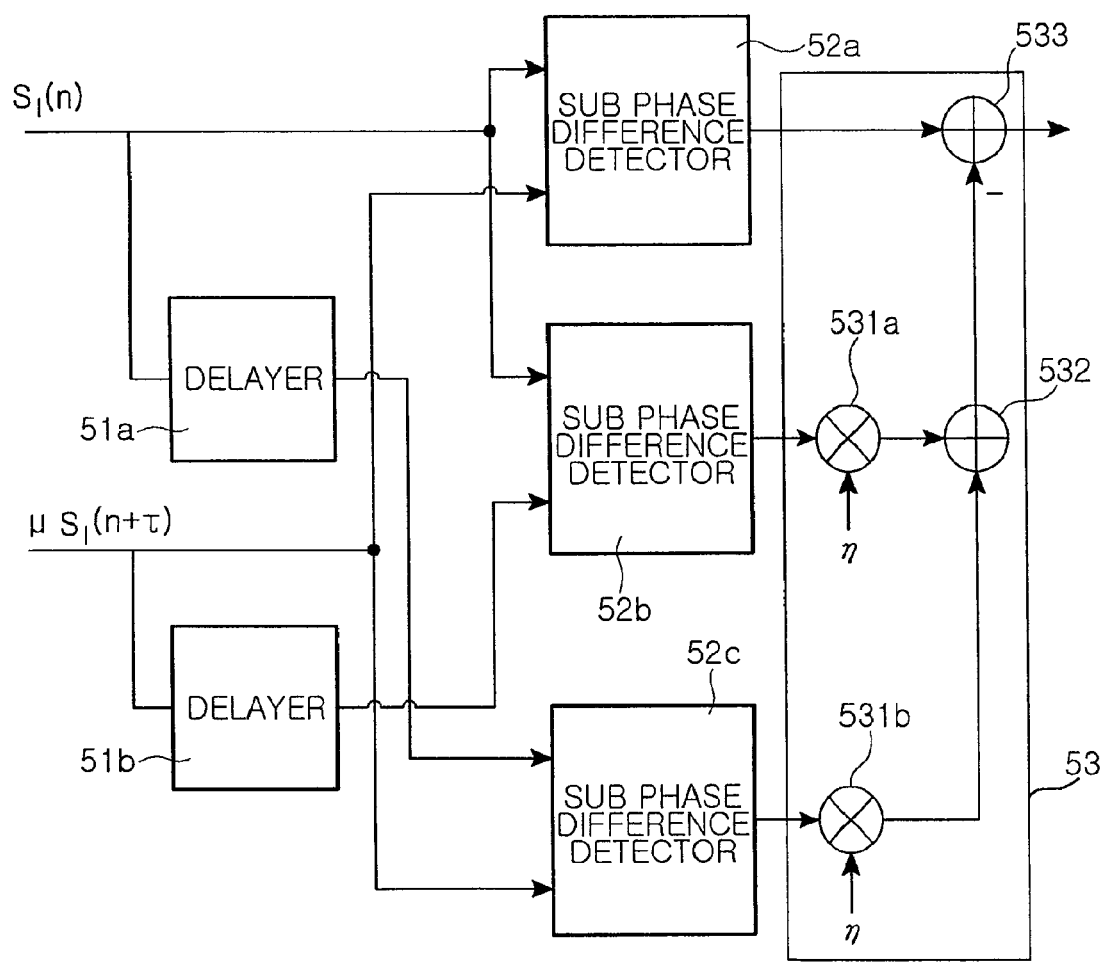
FIG. 5 is a block diagram illustrating a construction of a first phase difference detector which is included in a time domain amplitude IQ mismatch detection unit according to the present invention.

FIG. 5 is a block diagram illustrating a construction of a first phase difference detector which is included in a time domain amplitude IQ mismatch detection unit according to the present invention. As shown in FIG. 5, the first phase difference detector may include: a third delayer 51a which delays the currently-input I-channel signal $S_I(n)$ by one sample interval and output a result thereof; a fourth delayer 51b which delays the delayed I-channel signal multiplied with the attenuation coefficient μSI(n+τ) by one sample interval and outputs a result thereof; a first sub phase difference detector 52a which multiplies the currently-input I-channel signal with the delayed I-channel signal multiplied with the attenuation coefficient and output a result thereof; a second sub phase difference detector 52b which multiplies the currently-input I-channel signal with the output of the fourth delayer 51b and output a result thereof; a third sub phase difference detector 52c which multiplies the delayed I-channel signal multiplied with the attenuation coefficient with the output of the third delayer 51a and output a result thereof; and an I-channel phase difference arithmetic unit 53 which multiplies the outputs of the second and third sub phase difference detectors 52b and 52c with the attenuation coefficient, add results thereof, subtracts the addition result from the output of the first sub phase difference detector 52a, and output a result thereof.

The third delayer 51a, the fourth delayer 51b, the first sub phase difference detector 52a, the second sub phase difference detector 52b, the third sub phase difference detector 52c, and the I-channel phase difference arithmetic unit 53 in the first phase difference detector correspond to the first delayer 21a, the second delayer 21b, first phase mismatch detector 22a, the second phase mismatch detector 22b, the third phase mismatch detector 22c, and the phase IQ mismatch detection unit 23 of FIG. 2, respectively.

Figure 6:
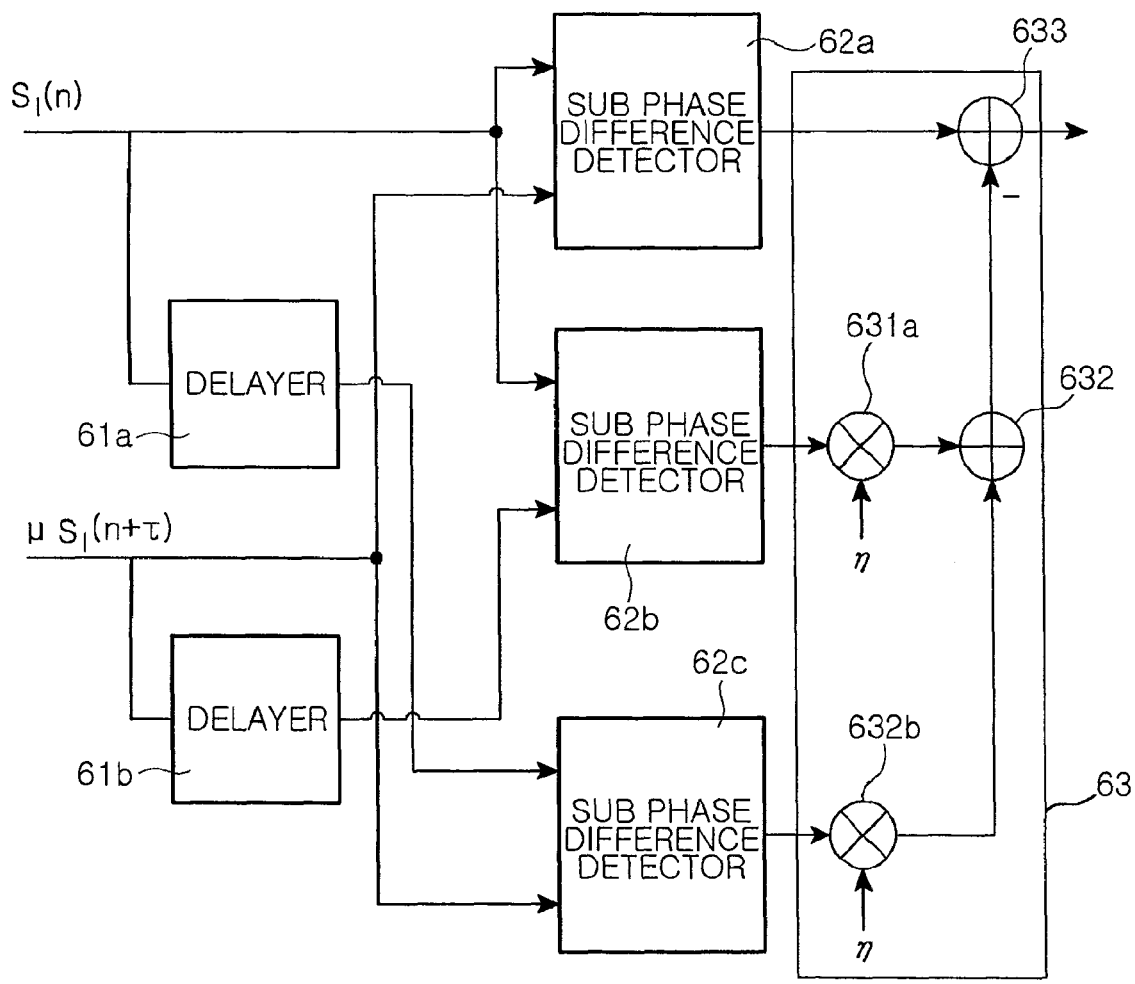
FIG. 6 is a block diagram illustrating a construction of a first phase difference detector which is included in a time domain amplitude IQ mismatch detection unit according to the present invention.

FIG. 6 is a block diagram illustrating a construction of a first phase difference detector which is included in a time domain amplitude IQ mismatch detection unit according to the present invention. As shown in FIG. 5, the second phase difference detector may include: a fifth delayer 61a which delays the currently-input Q-channel signal $S_Q(n)$ by one sample interval and output a result thereof; a sixth delayer 61b which delays the delayed Q-channel signal multiplied with the attenuation coefficient μ$S_Q$(n+τ) by one sample interval and output a result thereof; a fourth sub phase difference detector 62a which multiplies the currently-input Q-channel signal with the delayed Q-channel signal multiplied with the attenuation coefficient and output a result thereof; a fifth sub phase difference detector 62b which multiplies the currently-input Q-channel signal with the output of the sixth delayer 61b and output a result thereof; a sixth sub phase difference detector 62c which multiplies the delayed Q-channel signal multiplied with the attenuation coefficient with the output of the fifth delayer 61a and output a result thereof; and a Q-channel phase difference arithmetic unit 63 which multiplies the outputs of the fifth and sixth sub phase difference detectors 62b and 62c with the attenuation coefficient, adds results thereof, subtracts the addition result from the output of the third sub phase difference detector 62a, and output a result thereof.

Similar to the first phase difference detector, the fifth delayer 61a, the sixth delayer 61b, the fourth sub phase difference detector 62a, the fifth sub phase difference detector 62b, the sixth sub phase difference detector 62c, and the Q-channel phase difference arithmetic unit 63 in the second phase difference detector correspond to the first delayer 21a, the second delayer 21b, first phase mismatch detector 22a, the second phase mismatch detector 22b, the third phase mismatch detector 22c, and the phase IQ mismatch detection unit 23 of FIG. 2, respectively.

The operations of the first phase difference detector and the second phase difference detector are the same as those of the aforementioned phase IQ mismatch detection unit, and thus, detailed description thereof is omitted.

According to the present invention, in an environment where a received signal is influenced by fading caused from a communication channel, phase IQ mismatch and amplitude IQ mismatch can be detected by minimizing the influence of fading, so that it is possible to greatly improve a reliability of detection of the phase IQ mismatch and the amplitude IQ mismatch According to the present invention, the phase IQ mismatch and the amplitude IQ mismatch are detected by minimizing the influence of the fading, so that it is possible to improve time-domain IQ mismatch compensation performance. Particularly, it is possible to provide time-domain IQ mismatch compensation suitable for a communication system such as a terrestrial digital multimedia broadcasting (T-DMB) system having a small number of pilot signals.

While the present invention has been shown and described in connection with the exemplary embodiments, it will be apparent to those skilled in the art that modifications and variations can be made without departing from the spirit and scope of the invention as defined by the appended claims.

What is claimed is:

1. A time-domain IQ mismatch detection apparatus for detecting mismatch between an I-channel signal and a Q-channel signal in unit of a sample included in a symbol of an OFDM (orthogonal frequency division multiplexing) signal received by an OFDM receiver, the time-domain IQ mismatch detection apparatus comprising a phase IQ mismatch detection unit, wherein the phase IQ mismatch detection unit comprises:
a first delayer which delays an input I-channel signal by one sample interval;
a second delayer which delays an input Q-channel signal by one sample interval;
a first phase mismatch detector which multiplies a currently-input I-channel signal with a currently-input Q-channel signal and output a result thereof;
a second phase mismatch detector which multiplies the currently-input I-channel signal and the delayed Q-channel signal and output a result thereof;
a third phase mismatch detector which multiplies the delayed I-channel signal with the currently-input Q-channel signal and output a result thereof; and
a phase error arithmetic unit which multiplies the outputs of the second and third phase mismatch detectors with an attenuation coefficient, adds results thereof, and subtracts the addition result from the output of the first phase mismatch detector to output a phase error value.

2. The time-domain IQ mismatch detection apparatus of claim 1, wherein the phase error arithmetic unit comprises:
a first multiplier which multiplies the output of the second phase mismatch detector with the attenuation coefficient;
a second multiplier which multiplies the output of the third phase mismatch detector with the attenuation coefficient;
an adder which adds the outputs of the first multiplier and the second multiplier; and
a subtractor which subtracts the output of the adder from the output of the first phase mismatch detector.

3. A time-domain IQ mismatch detection apparatus for detecting mismatch between an I-channel signal and a Q-channel signal in unit of a sample included in a symbol of an OFDM signal received by an OFDM receiver, the time-domain IQ mismatch detection apparatus comprising an amplitude IQ mismatch detection unit, wherein the amplitude IQ mismatch detection unit comprises:

a first delayer which delays an input I-channel signal by one sample interval;

a first multiplier which multiplies the delayed I-channel signal with an attenuation coefficient;

a first phase difference detector which obtains a phase difference between a currently-input I-channel signal and the delayed I-channel signal multiplied with an attenuation coefficient;

a modified I-channel amplitude arithmetic unit which adds an absolute value of the currently-input I-channel signal and an absolute value of the delayed I-channel signal multiplied with the attenuation coefficient and subtracts a multiplication value of the phase difference obtained by the first phase difference detector with a conversion coefficient from the addition result and outputs a result thereof;

a second delayer which delays an input Q-channel signal by one sample interval;

a second multiplier which multiplies the delayed Q-channel signal with the attenuation coefficient;

a second phase difference detector which obtains a phase difference between a currently-input Q-channel signal and the delayed Q-channel signal multiplied with the attenuation coefficient;

a modified Q-channel amplitude arithmetic unit which adds an absolute value of the currently-input Q-channel signal and an absolute value of the delayed Q-channel signal multiplied with the attenuation coefficient and subtracts a multiplication value of the phase difference obtained by the second phase difference detector with the conversion coefficient from the addition result and outputs a result thereof; and an amplitude error arithmetic unit which subtracts the output of the modified Q-channel amplitude arithmetic unit from the output of the modified I-channel amplitude arithmetic unit.

4. The time-domain IQ mismatch detection apparatus of claim 3, wherein the modified I-channel amplitude arithmetic unit comprises:

a first absolute value arithmetic unit which calculates an absolute value of the currently-input I-channel signal and outputs the absolute value;

a second absolute value arithmetic unit which calculates an absolute value of the delayed I-channel signal multiplied with the attenuation coefficient and outputs the absolute value;

a third multiplier which multiplies the conversion coefficient with the output of the first phase difference detector and output a result thereof;

a first adder which adds the output of the second absolute value arithmetic unit and the output of the third multiplier and output a result thereof; and a second adder which adds the outputs of the first absolute value arithmetic unit and the output of the first adder and output a result thereof.

5. The time-domain IQ mismatch detection apparatus of claim 4, wherein the modified Q-channel amplitude arithmetic unit comprises:

a third absolute value arithmetic unit which calculates an absolute value of the currently-input Q-channel signal and outputs the absolute value;

a fourth absolute value arithmetic unit which calculates an absolute value of the delayed Q-channel signal multiplied with the attenuation coefficient and outputs the absolute value;

a fourth multiplier which multiplies the conversion coefficient with the output of the second phase difference detector and output a result thereof;

a third adder which adds the output of the fourth absolute value arithmetic unit and the output of the fourth multiplier and output a result thereof; and a fourth adder which adds the outputs of the third absolute value arithmetic unit and the output of the third adder and output a result thereof.

6. The time-domain IQ mismatch detection apparatus of claim 5, wherein the amplitude error arithmetic unit is a subtractor which subtracts the output of the fourth adder from the output of the second adder.

7. The time-domain IQ mismatch detection apparatus of claim 3, wherein the first phase difference detector comprises:

a third delayer which delays the currently-input I-channel signal by one sample interval and output a result thereof;

a fourth delayer which delays the delayed I-channel signal multiplied with the attenuation coefficient by one sample interval and output a result thereof;

a first sub phase difference detector which multiplies the currently-input I-channel signal with the delayed I-channel signal multiplied with the attenuation coefficient and output a result thereof;

a second sub phase difference detector which multiplies the currently-input I-channel signal with the output of the fourth delayer and output a result thereof;

a third sub phase difference detector which multiplies the delayed I-channel signal multiplied with the attenuation coefficient with the output of the third delayer; and an I-channel phase difference arithmetic unit which multiplies the outputs of the second and third sub phase difference detectors with the attenuation coefficient, adds results thereof, subtract the addition result from the output of the first sub phase difference detector, and output a result thereof.

8. The time-domain IQ mismatch detection apparatus of claim 3, wherein the second phase difference detector comprises:

a fifth delayer which delays the currently-input Q-channel signal by one sample interval and output a result thereof;

a sixth delayer which delays the delayed Q-channel signal multiplied with the attenuation coefficient by one sample interval and output a result thereof;

a fourth sub phase difference detector which multiplies the currently-input Q-channel signal with the delayed Q-channel signal multiplied with the attenuation coefficient and output a result thereof;

a fifth sub phase difference detector which multiplies the currently-input Q-channel signal with the output of the sixth delayer and output a result thereof;

a sixth sub phase difference detector which multiplies the delayed Q-channel signal multiplied with the attenuation coefficient with the output of the fifth delayer; and a Q-channel phase difference arithmetic unit which multiplies the outputs of the fifth and sixth sub phase difference detectors with the attenuation coefficient, adds results thereof, subtract the addition result from the output of a third sub phase difference detector, and output a result thereof.

* * * * *